United States Patent [19]

Nihls et al.

[11] Patent Number: 5,160,955
[45] Date of Patent: Nov. 3, 1992

[54] SHUTTER ACTUATING APPARATUS

[76] Inventors: Bradley J. Nihls; Kathryn M. Nihls, both of 5393 Royal Hills Dr., St. Louis, Mo. 63129

[21] Appl. No.: 649,991

[22] Filed: Feb. 4, 1991

[51] Int. Cl.$^5$ .............................................. G03B 17/38
[52] U.S. Cl. ..................................... 354/269; 354/295
[58] Field of Search ................ 354/266, 269, 293, 295

[56] References Cited

U.S. PATENT DOCUMENTS

| | | | |
|---|---|---|---|
| 1,235,273 | 7/1917 | Wollensak | 354/269 |
| 1,805,185 | 5/1931 | Ramsey | 354/269 |
| 4,794,414 | 12/1988 | Kozina et al. | 354/269 |

Primary Examiner—L. T. Hix
Assistant Examiner—J. K. Han
Attorney, Agent, or Firm—David L. Baker

[57] ABSTRACT

A shutter actuation apparatus is described that is used in combination with a camera, a camera shutter release button and a cable shutter release. The apparatus has a first and second base. Both bases have gripping side members that grip the body of the camera. The apparatus is snugly attached to the body of the camera over the shutter release button and an adapter is aligned with the shutter release button and secured in place. The first base has a longitudinal locator slot to allow the adapter to be moved into more complete alignment with the shutter button. The cable shutter release is then connected to the adapter. This allows a camera that has no provision for using a cable shutter release to be used with one. The first and second base members have a coating of plastic-like material on their lower surface to reduce the chance of scratching the surface of the camera and to enhance the grip of the side members on the camera body.

5 Claims, 1 Drawing Sheet

SHUTTER ACTUATING APPARATUS

BACKGROUND OF THE INVENTION

1. Field of the Invention

Often it is necessary, when taking a photographic image of a subject, to actuate the shutter release on a camera without physically touching the shutter release. Physically touching the release or the body of the camera can produce movement of the film plane and the lens. In many instances, any movement during a long exposure can greatly deteriorate the quality of the image produced on the film. An established method of reducing the chance of unwanted movement has involved the use of a cable shutter release apparatus.

The cable normally screw fastens into a female receptacle provided in the camera shutter release. Some cameras, however, have shutter releases that do not provide the female receptacle to attach the cable shutter release. The present invention provides a means to utilize a cable shutter release with those cameras whose shutter releases do not have built in means to receive the cable.

2. Description of the Related Art.

U.S. Pat. No. 1,235,273 to A. Wollensak on Jul. 31, 1917 shows a release mechanism for a photographic shutter that provides a guide that attaches to the end of a cable shutter release.

U.S. Pat. No. 1,805,185 to J.M. Ramsey on May 12, 1931 describes a combined support and shutter actuating means for cameras. The cable release cooperates with the camera body support such as a tripod to allow the cameraman to operate and position the camera at the same time.

SUMMARY OF THE INVENTION

This invention relates to shutter actuating apparatus that allows a cable shutter release to be used on cameras that do not have a built-in means to accept a cable release in their shutter release mechanisms. When the apparatus is placed over the shutter release and secured to the camera body, a threaded adapter is aligned with the shutter release button and locked into place. The cable release can then be attached to the adapter and the cable release used in its designed manner to depress the button. This enhances the stability of the camera during long exposures and allows operation of the shutter release from a position remote from the camera.

A shutter actuating apparatus used in combination with a camera, a camera shutter release mechanism and a cable shutter release has a first base member with a first gripping side member thereon to releasingly grip a body of the camera and a second base member that is slidably engaged with the first base member. The second base member has a second gripping side member thereon to releasingly grip the body of the camera. The gripping side members of the first and second base member have inwardly sloping sides to provide an enhanced grip on the body of the camera. There is a longitudinal locating slot in the first base member and a port in the second base member. A second base member fastener is slidingly positioned in the longitudinal locating slot and passes through the second port. The second base member fastener releasingly and adjustably connects the second base member to the first base member. There is a cable release receiving adapter slidingly positioned in the longitudinal locating slot to position and align the cable shutter release with the camera shutter release mechanism.

There may be a coating of pliable plastic-like material on a lower surface of the first base member and on a lower surface of the second base member to project the body of the camera. The coating also enhances the grip of the side member of the first base member and the grip of the side member of the second base member on the body of the camera. There may be a rotation restriction tab on a bolt portion of the second base member fastener. The adapter may have a female thread placed in a circumference of an inner passageway through the adapter. The female thread is placed therein to releasingly receive a male thread of the cable shutter release. There may be an adapter fastener, threadingly placed on the adapter, to releasingly secure the adapter in a selected position along the longitudinal locating slot of the first base member.

It is an object of this invention to provide a shutter actuation apparatus that will allow the user to use a cable shutter release on a camera that does not provide means to attach the cable shutter release.

DESCRIPTION OF THE PREFERRED EMBODIMENT

Figures 1, 2:
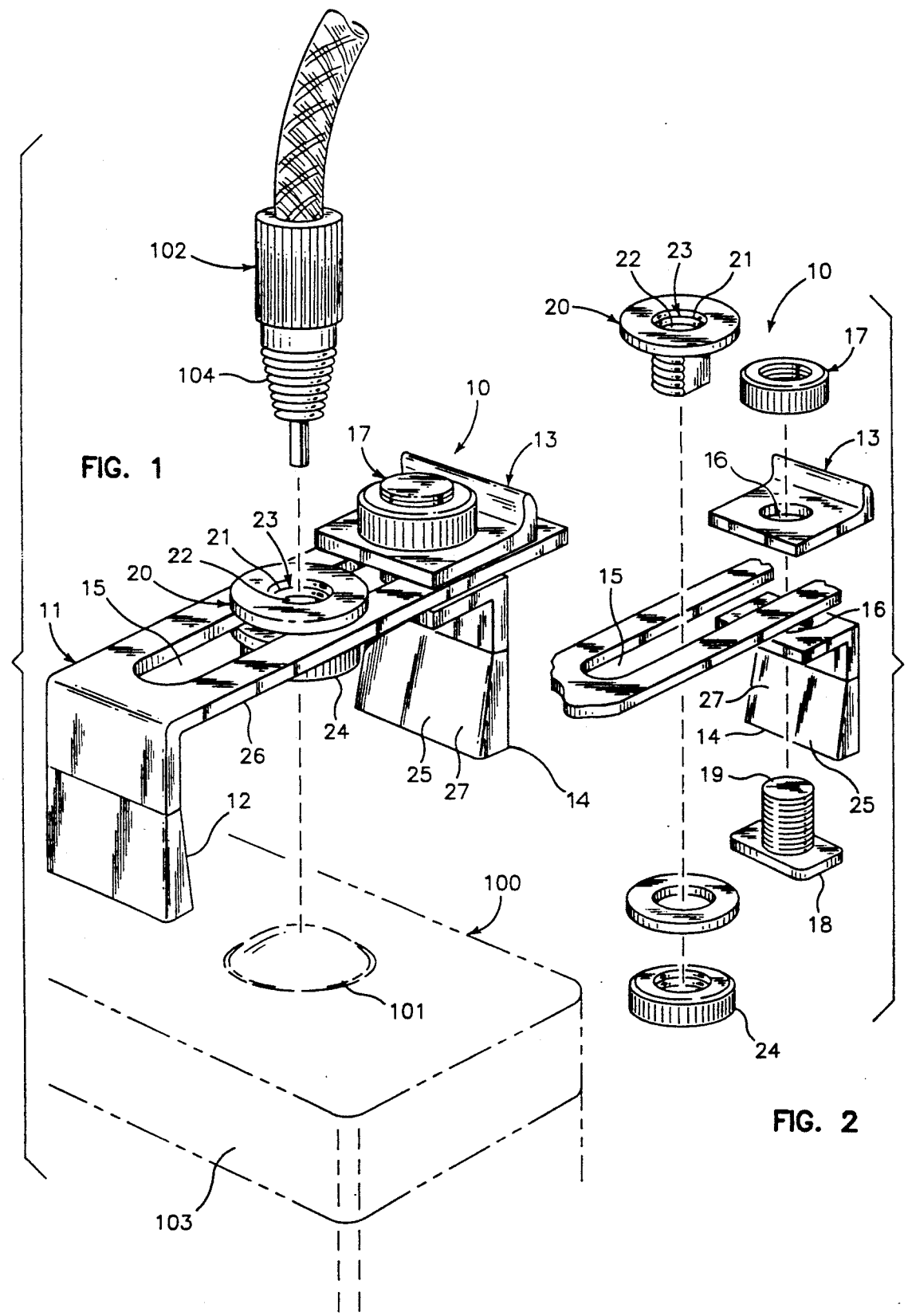
FIG. 1 is a perspective view of an assembled Shutter Actuating Apparatus and shows a view of the exploded relationship of the Apparatus with a cable shutter release and a camera body which are shown in phantom.
FIG. 2 is an exploded view of the Shutter Actuating Apparatus.

A shutter actuating apparatus 10 used in combination with a camera 100, a camera shutter release mechanism 101 and a cable shutter release 102 is shown in FIGS. 1 and 2.

The shutter actuating apparatus 10 has a first base member 11 that has a first gripping side member 12 thereon to releasingly grip a body 103 of the camera 100. A second base member 13 is slidably engaged with the first base member 11. The second base member 13 has a second gripping side member 14 thereon to releasingly grip the body 103 of the camera 100 (second base member 13 is shown in two parts but could be made in one piece).

There is a longitudinal locating slot 15 in the first base member 11 and a port 16 in the second base member 13. A second base member fastener 17 is slidingly positioned in the longitudinal locating slot 15 and passes through the second port 16. The fastener 17 releasingly and adjustably connects the second base member 13 to the first base member 11. There is a rotation restriction tab 18 on a bolt portion 19 of the second base member fastener 17.

A cable release receiving adapter 20 is slidingly positioned in the longitudinal locating slot 15 to position and align the cable shutter release 102 with the camera shutter release mechanism 101. There is a female thread 21, in a circumference 22 of an inner passageway 23 through the adapter 20, to releasingly receive a male thread 104 of the cable shutter release 102. An adapter fastener 24 is threadingly placed on the adapter 20 to releasingly secure the adapter 20 in a selected position along the longitudinal locating slot 15 of the first base member 11.

There is a coating of pliable plastic-like material 25 on a lower surface 26 of the first base member and on a lower surface 27 of the second base member 13 to protect the body 103 of the camera 100 and to enhance the grip of the side member 12 of the first base member 11 and the grip of the side member 14 of the second base member 13 on the body 103 of the camera 100.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A shutter actuating apparatus used in combination with a camera, a camera shutter release mechanism and a cable shutter release comprising:
   a. a first base member having a first gripping side member thereon to releasingly grip a body of the camera;
   b. a second base member slidably engaged with the first base member and having a second gripping side member thereon to releasingly grip the body of the camera;
   c. a longitudinal locating slot in the first base member;
   d. a port in the second base member;
   e. a second base member fastener, slidingly positioned in the longitudinal locating slot and passing through the port, to releasingly and adjustably connect the second base member to the first base member; and
   f. a cable release receiving adapter slidingly positioned in the longitudinal locating slot to position and align the cable shutter release with the camera shutter release mechanism.

2. A shutter actuating apparatus as described in claim 1 further comprising a coating of pliable plastic-like material on a lower surface of the first base member and on a lower surface of the second base member to protect the body of the camera and to enhance the grip of the side member of the first base member and the grip of the side member of the second base member on the body of the camera.

3. A shutter actuating apparatus as described in claim 1 further comprising a rotation restriction tab on a bolt portion of the second base member fastener.

4. A shutter actuating apparatus as described in claim 1 wherein the adapter further comprises:
   a. a female thread, in a circumference of an inner passageway through the adapter, to releasingly receive a male thread of the cable shutter release; and
   b. an adapter fastener, threadingly placed on the adapter, to releasingly secure the adapter in a selected position along the longitudinal locating slot of the first base member.

5. A shutter actuating apparatus used in combination with a camera, a camera shutter release mechanism and a cable shutter release comprising:
   a. a first base member having a first gripping side member thereon to releasingly grip a body of the camera;
   b. a second base member slidably engaged with the first base member and having a second gripping side member thereon to releasingly grip the body of the camera;
   c. a longitudinal locating slot in the first base member;
   d. a port in the second base member;
   e. a second base member fastener, slidingly positioned in the longitudinal locating slot and passing through the port, to releasingly and adjustably connect the second base member to the first base member;
   f. a rotation restriction tab on a bolt portion of the second base member fastener;
   g. a cable release receiving adapter slidingly positioned in the longitudinal locating slot to position and align the cable shutter release with the camera shutter release mechanism;
   h. a female thread, in a circumference of an inner passageway through the adapter, to releasingly receive a male thread of the cable shutter release;
   i. an adapter fastener, threadingly placed on the adapter, to releasingly secure the adapter in a selected position along the longitudinal locating slot of the first base member; and
   j. a coating of pliable plastic-like material on a lower surface of the first base member and on a lower surface of the second base member to protect the body of the camera and to enhance the grip of the side member of the first base member and the grip of the side member of the second base member on the body of the camera.

* * * * *